US007921008B2

(12) United States Patent
Huang et al.

(10) Patent No.: US 7,921,008 B2
(45) Date of Patent: Apr. 5, 2011

(54) METHODS AND APPARATUS FOR VOICE ACTIVITY DETECTION

(75) Inventors: Heyun Huang, Shanghai (CN); Tan Li, Shanghai (CN); Fu-Huei Lin, Cupertino, CA (US)

(73) Assignee: Spreadtrum Communications, Inc., George Town, Grand Cayman (KY)

( * ) Notice: Subject to any disclaimer, the term of this patent is extended or adjusted under 35 U.S.C. 154(b) by 781 days.

(21) Appl. No.: 11/858,664

(22) Filed: Sep. 20, 2007

(65) Prior Publication Data

US 2008/0133226 A1 Jun. 5, 2008

(30) Foreign Application Priority Data

Sep. 21, 2006 (CN) .......................... 2006 1 0116315

(51) Int. Cl.
*G10L 11/06* (2006.01)
*G10L 21/02* (2006.01)
*G10L 15/20* (2006.01)

(52) U.S. Cl. ......................... 704/210; 704/227; 704/233

(58) Field of Classification Search ........................ None
See application file for complete search history.

(56) References Cited

U.S. PATENT DOCUMENTS

| | | | | |
|---|---|---|---|---|
| 5,276,765 A * | 1/1994 | Freeman et al. | .............. | 704/233 |
| 5,689,615 A * | 11/1997 | Benyassine et al. | .......... | 704/219 |
| 6,061,647 A * | 5/2000 | Barrett | .......................... | 704/208 |
| 6,188,981 B1 * | 2/2001 | Benyassine et al. | .......... | 704/233 |
| 6,633,841 B1 * | 10/2003 | Thyssen et al. | ............... | 704/233 |
| 6,823,303 B1 * | 11/2004 | Su et al. | ........................ | 704/220 |
| 2004/0267525 A1 * | 12/2004 | Lee et al. | ...................... | 704/208 |

* cited by examiner

*Primary Examiner* — Brian L Albertalli

(57) ABSTRACT

A method for detecting voice activity comprises pre-processing a first frame in an audio frame sequence, receiving a subsequent frame as a current frame, calculating weighted linear prediction energy of the current frame based on $N^{th}$-order linear prediction coefficients, determining whether the current frame contains a noise or speech, if a speech is indicated, performing linear prediction analysis on the current frame to derive new $N^{th}$-order linear prediction coefficients and updating the coefficients with the derived one; if a nose is indicated and not the last frame, repeating the calculating and determining process. The corresponding device comprises a component for storing Nth-order linear prediction coefficients, a component for performing linear prediction analysis, a component for computing weighted linear prediction energy and a component for determining whether the current frame contains speech or noise based on calculated weighted linear prediction energy.

10 Claims, 4 Drawing Sheets

METHODS AND APPARATUS FOR VOICE ACTIVITY DETECTION

CROSS-REFERENCE TO RELATED APPLICATION(S)

This application claims priority from Chinese Patent Application No. 200610116315.8, filed Sep. 21, 2006, the entire disclosure of which is incorporated herein by reference.

TECHNICAL FIELD

The disclosure relates generally to signal detection methods; especially to methods for detecting speech and noise in an audio frame sequence.

BACKGROUND

FIG. 1 illustrates a method for transmitting audio signals in today's communication devices. As shown in FIG. 1, the method includes first performing voice activity detection to determine whether the current audio frame contains speech or noise. Voice activity detection typically includes a signal feature extraction module 11 and a speech/noise decision module 12 as shown in FIG. 2. In the signal feature extraction method module 11, feature vectors of the current frame are extracted. With these feature vectors, the speech/noise decision module 12 decides whether the current frame contains noise or speech. The reason for distinguishing speech from noise using voice activity detection is because typical audio sequences contain a lot of noise (e.g., sometimes approaching 50% of the signal). Thus, coding/decoding the speech and noise using the same method can be wasteful and unreasonable. Accordingly, coding/decoding speech and noise differently after distinguishing them would be desirable to, for example, reduce the number of bits and the amount of coding/decoding calculation.

DETAILED DESCRIPTION

Figure 1:
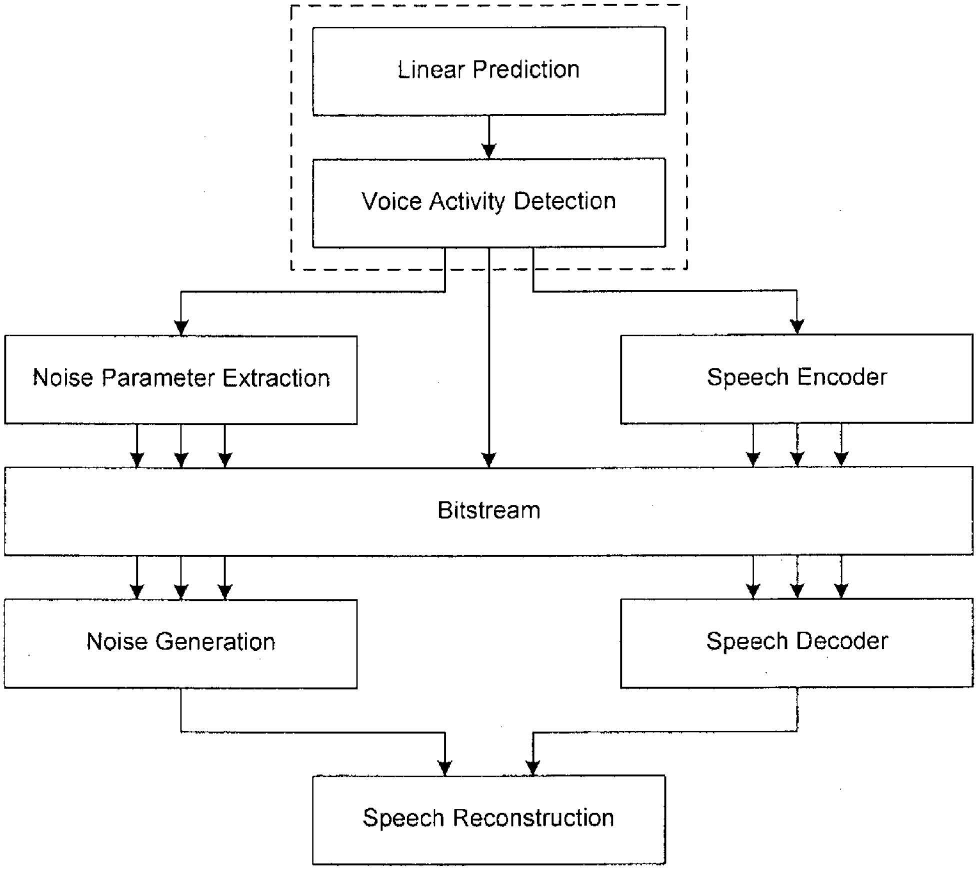
FIG. 1 is a block diagram illustrating a process of audio signal detection, encoding, and decoding in accordance with the prior art.
Figure 2:
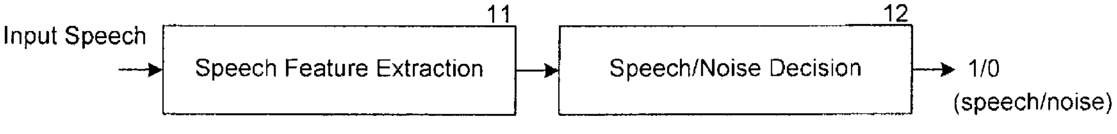
FIG. 2 is a block diagram illustrating a method of voice activity detection.

The present disclosure describes devices, systems, and methods for voice activity detection. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the invention. Additionally, the invention can include other embodiments that are within the scope of the claims but are not described in detail with respect to FIGS. 3-5.

One aspect of several embodiments of the present disclosure relates generally to a method for voice activity detection and is useful for distinguishing speech from noise in an audio frame sequence. In several embodiments, the method can include the following processing stages:

(1) Pre-processing a first audio frame;

(2) Receiving the next audio frame as the current frame;

(3) Computing the weighted linear prediction energy of the current frame according to $N^{th}$-order linear prediction coefficients (N is a natural number);

(4) Determining whether the current frame contains speech based on the computed weighted linear prediction energy. If speech is indicated, the next stage is performed; otherwise, the current frame is recognized as a noise frame, and the process skips to stage 6;

(5) Performing linear prediction analysis on the current frame to derive the $N^{th}$-order linear prediction coefficients for the current frame and replacing the linear prediction coefficients used in stage 3 with the newly derived coefficients;

(6) Determining whether the current frame is the last one in the audio frame sequence. If yes, the process ends; otherwise, the process reverts to stage 2.

In certain embodiments, in the method described above, stage 1 can further contain the following processing stages:

(a) Performing linear prediction analysis on the first audio frame and calculating the $N^{th}$-order linear prediction coefficients;

(b) Computing the weighted linear prediction energy of the first frame using the calculated $N^{th}$-order linear prediction coefficients; and (c) Determining whether speech signal exists based on the computed weighted linear prediction energy.

In the method described above, computing the weighted linear prediction energy can include the following calculation stages:

Establishing an n×n matrix A based on the $N^{th}$-order linear prediction coefficients $a_1$~$a_N$. n is the number of sample points in the current frame. Matrix A can be represented as $A=[K_{ij}]$, in which $1 \leqq i, j \leqq n$, and both i and j are natural numbers. $K_{ij}=1$ when $i-j=0$; $K_{ij}=0$ when $i-j<0$ or $i-j>N$; and $K_{ij}=a_{i-j}$ when $0<i-j \leqq N$;

Calculating the inverse matrix of A as $A^{-1}=[K_{ij}]^{-1}$, in which $1 \leqq i, j \leqq n$, and both i and j are natural numbers;

Calculating intermediate parameters $b_1$~$b_N$ as $b_i=K_{1,i+1}^{-1}$, $1 \leqq i \leqq N$, where N is an integer;

Calculating an intermediate parameter sequence z(i) where i is an integer between 0 and N−1, as follows:

$$z(0)=s(0) \text{ when } i=0;$$

$$z(i) = \sum_{j=1}^{N} b_i * s(i-j) + s(i)$$

when $1 \leqq i < N$, where s(i) are sample points of the current frame.

Calculating the weighted linear prediction energy (LPE) as follows:

$$LPE = \sum_{j=0}^{N-1} Z^2(j)$$

In stage 4 of the method described above, the method can include setting a threshold. If the derived weighted energy is larger than the threshold, the frame is indicated as a speech frame; otherwise, the frame is indicated as a noise frame. In certain embodiments, the threshold is set as the average weighted energy of multiple previous frames, or the threshold can be set according to the noise energy.

In stage 5 of the method described above, the linear prediction analysis can be performed during speech encoding.

In certain embodiments, the method of voice activity detection described above can also include calculating the zero-crossing rate (ZCR) of the sample points in each frame as follows:

$$ZCR = \sum_{i=0}^{n-2} \text{sgn}(s(i+1) * s(i))$$

where s(0)~s(n−1) are sample points of a frame and n is the number of sample points and determining whether the frame contains speech based on the ZCR of the sample points in the frame.

In other embodiments, the method of voice activity detection described above can also include a decision stage based on a low-frequency energy (LFE) of the current frame. The LFE can be calculated for the sample points of each frame as follows:

$$\text{LFE} = h(i) \otimes s(i)$$

where h(i) is a low-pass filter, and s(i) is the sample points of the current frame. In the LFE decision stage, whether the frame contains speech can be determined based on the calculated LFE.

In other embodiments, the method of voice activity detection described above can also include a decision stage based on a total energy (TE) of the current frame. A total energy of the current frame can be calculated for the sample points of each frame as follows:

$$TE = \sum_{i=0}^{n-1} S^2(i)$$

where s(i) are sample points of the current frame.

In the TE decision stage, whether the frame contains speech can be determined based on the calculated TE.

Another aspect of the present disclosure relates generally to a device for voice activity detection useful for distinguishing speech from noise. The device can include

- a component for storing $N^{th}$-order linear prediction coefficients;
- a component for performing linear prediction analysis; this component performs linear prediction analysis on the first audio frame to acquire the $N^{th}$-order linear prediction coefficients to be used as the initial value for the $N^{th}$-order linear prediction coefficient variable; this component also performs linear prediction analysis on successive audio frames and updates the $N^{th}$-order linear prediction coefficient variable with the derived linear prediction coefficients of successive frames;
- a component for computing a weighted linear prediction energy for calculating the weighted linear prediction energy of each audio frame. This component further includes:
  - a component for establishing an n×n matrix A based on the $N^{th}$-order linear prediction coefficients $a_1$~$a_N$. n is the number of sample points in the current frame. Matrix A can be represented as $A=[K_{ij}]$, in which 1≦i, j≦n, and both i and j are natural numbers. $K_{ij}=1$ when i−j=0; $K_{ij}=0$ when i−j<0 or i−j>N; and $K_{ij}=a_{i-j}$ when 0<i−j≦N;
- a component for calculating an inverse matrix of matrix A as $A^{-1}=[K_{ij}^{-1}]$, where 1≦i, j≦n and i, and j are natural numbers,
- a coefficient conversion component for calculating intermediate parameters $b_1$~$b_N$, and $b_i=K_{1,i+1}^{-1}$;
- a component for calculating a weighted linear prediction energy; this component first calculates an intermediate parameter sequence z(i) where i is an integer between 0 and N−1, as follows:

$$z(0)=s(0) \text{ when } i=0;$$

$$z(i) = \sum_{j=1}^{N} b_i * s(i-j) + s(i)$$

when 1≦i<N, where s(i) are sample points of the current frame and calculates the weighted linear prediction energy $$(LPE) \text{ as } LPE = \sum_{j=0}^{N-1} Z^2(j);$$

- a component for determining whether the current frame contains speech or noise based on the calculated weighted linear prediction energy. If the audio frame is determined to contain speech, the component transmits the current frame to the component for performing linear prediction analysis.

In one aspect of several embodiments of the present disclosure, linear prediction analysis is not performed during extraction of signal characteristics. Instead, the linear prediction coefficients of the first frame is used as the initial value for the linear prediction coefficient variable. The weighted linear prediction energy of successive frames can then be calculated based on the value contained in the linear prediction coefficient variable. If the current frame is indicated to contain speech, then linear prediction analysis is performed on the current frame during encoding. The resulting linear prediction coefficients can be used to update the value of the linear prediction coefficient variable. As a result, several embodiments of the present disclosure can reduce calculation complexity while maintaining satisfactory level of detection.

Figure 3:
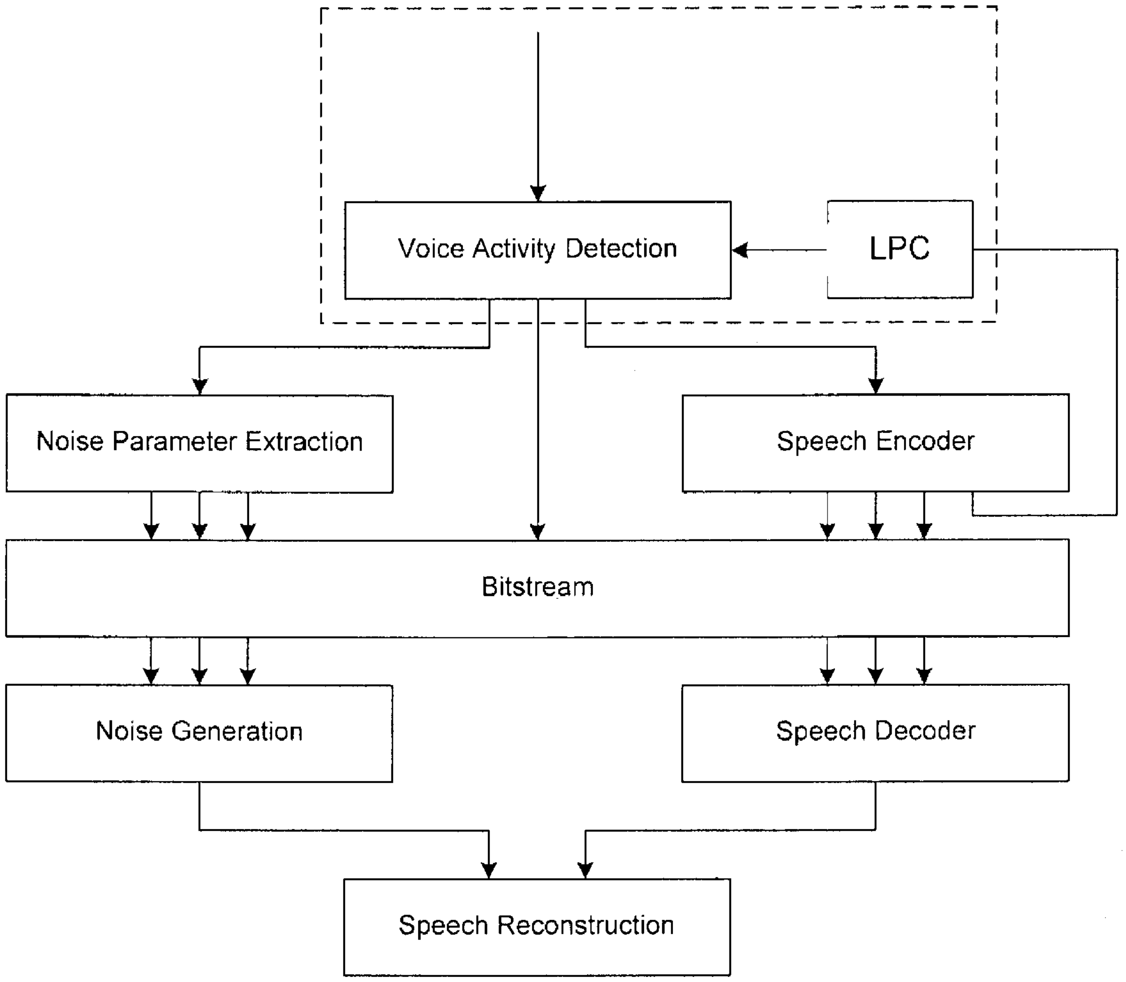
FIG. 3 is a block diagram illustrating a process of audio signal detection, encoding, and decoding in accordance with an embodiment of the present disclosure.

FIG. 3 is a block diagram illustrating a process of audio signal detection, encoding, and decoding in accordance with an embodiment of the present disclosure. Voice activity detection is first performed to recognize speech and noise. Then, noise parameters are extracted from noise frames, and speech frames are encoded. The speech frame encoding process also includes an LP analysis on the speech frames. LP parameters obtained from the LP analysis are transmitted back to the voice activity detection process. The noise parameters and speech codes are packaged and injected into a bit stream. When restoring the signals, comfort noise is created according to the noise parameters, and the speech codes are decoded. Finally, the signals are reconstructed according to the comfort noise and the decoded audio signals. As a result, the process shown in FIG. 3 omits the linear predicative analysis before the voice activity detection process when compared to that shown in FIG. 1. Instead, the process shown in FIG. 3 performs a linear predicative analysis on speech frames during subsequent speech encoding.

Figure 4:
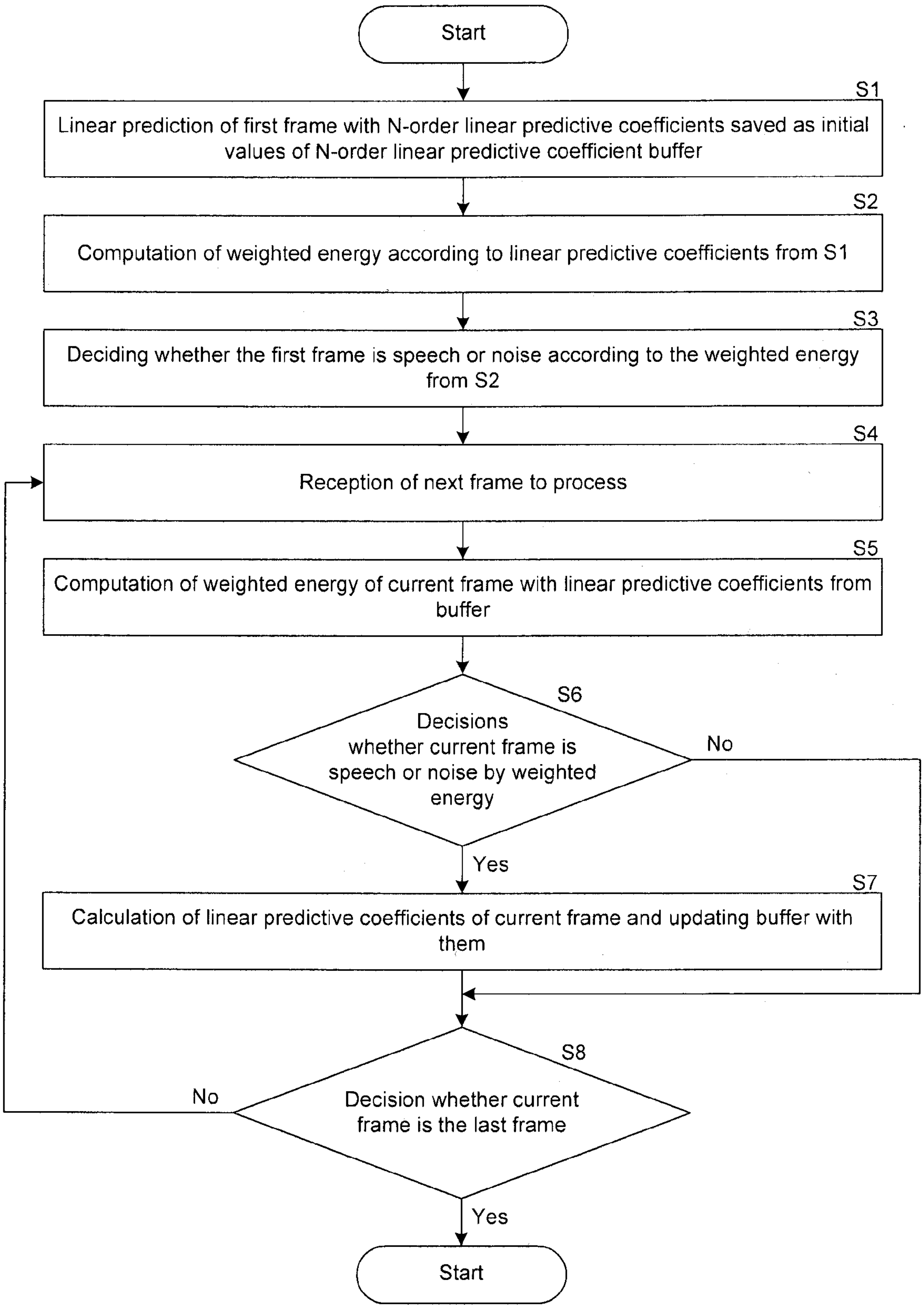
FIG. 4 is a flowchart illustrating a method of voice activity detection in accordance with an embodiment of the present disclosure.

FIG. 4 is a flowchart illustrating a method of voice activity detection in accordance with an embodiment of the present disclosure. The method can be used to detect speech frames in an audio sequence from noise frames. The method can include the following stages:

Stage S1: performing linear prediction analysis on the first frame in the audio sequence and calculate $N^{th}$-order linear prediction coefficients of the first frame; the calculated coefficients are then used as the initial value for the linear prediction coefficient variable.

Stage S2: computing a weighted linear prediction energy of the first frame based on the $N^{th}$-order linear prediction coefficients derived from stage S1.

Methods for calculating the weighted liner prediction energy for a frame can include the following stages:

Stage 1, Establishing an n×n matrix A based on the $N^{th}$-order linear prediction coefficients $a_1 \sim a_N$. n is the number of sample points in the current frame. Matrix A can be represented as $A=[K_{ij}]$, in which $1 \leqq i, j \leqq n$, and both i and j are natural numbers. $K_{ij}=1$ when $i-j=0$; $K_{ij}=0$ when $i-j<0$ or $i-j>N$; and $K_{ij}=a_{i-j}$ when $0<i-j \leqq N$.

Stage 2: calculating the inverse matrix of A as $A^{-1}=[K_{ij}]^{-1}$, in which $1 \leqq i, j \leqq n$, and both i and j are natural numbers.

Stage 3: calculating intermediate parameters $b_1 \sim b_N$ as $b_i=K_{1,i+1}^{-1}$ $1 \leqq i \leqq N$, where N is an integer.

Stage 4: calculating an intermediate parameter sequence z(i) where i is an integer between 0 and N−1, as follows:

$z(0)=s(0)$ when i=0;

$$z(i) = \sum_{j=1}^{N} b_i * s(i-j) + s(i)$$

when $1 \leqq i < N$, where s(i) are sample points of the current frame.

Stage 5: Calculating the weighted linear prediction energy (LPE) as $$LPE = \sum_{j=0}^{N-1} Z^2(j).$$

The following description uses fourth order linear prediction coefficients as examples to illustrate the method described above for computing a weighted linear prediction energy:

First, intermediate coefficients $b_1$, $b_2$, $b_3$, $b_4$ can be computed according to the matrix operations described above in stages 1-3 as follows:

$$b_4=-a_4+2a_3a_1+a_2^2-3a_2a_1^2+a_1^4$$

$$b_3=a_3+2a_2a_1a-a_1^3$$

$$b_2=-a_2+a_1^2$$

$$b_1=-a_1$$

Then, as described in stage 4 above, the intermediate sequence can be calculated as z(0)=s(0) when i=0; and $$z(i) = \sum_{j=1}^{4} b_i * s(i-j) + s(i)$$

when i=1, 2, . . . , N−1.

Finally, as described in stage 5 above, the weighted linear prediction energy can be calculated as:

$$LPE = \sum_{j=0}^{N-1} Z^2(j).$$

Stage S3: determining whether the current frame contains speech signal based on the weighted linear prediction energy calculated in Stage S2. In one embodiment, stage 3 can include setting a threshold, which can be determined by the noise energy. Stage 3 can also include if the weighted energy is larger than the threshold, the frame is indicated as a speech frame; otherwise, the frame is indicated as a noise frame.

Stage S4: receiving a new frame as the current speech frame.

Stage S5: calculating the weighted linear prediction energy of the current frame according to $N^{th}$-order linear prediction coefficient using techniques similar to that described in Stage 2.

Stage S6: determining whether the current frame contains speech signal based on the weighted linear prediction energy similar to the techniques described in Stage 3. If a speech signal exists, the process continues to the next stage; otherwise, indicate that the current frame is a noise frame and skips to Stage S8. The threshold can be set according to the noise energy or the averaged weighted linear prediction energy of the $m^{th}$ speech frame (m is pre-determined figure) from the first frame.

Stage S7: using the acquired $N^{th}$-order linear prediction coefficients of the current frame from the linear prediction analysis to update the $N^{th}$-order linear prediction coefficient variable. Subsequent linear prediction analysis can be performed during speech encoding. Thus, the $N^{th}$-order linear prediction coefficient used during each loop is that of the most recent speech frame.

Stage S8: determining whether the current frame is the last one in the audio frame sequence. If yes, the process ends; otherwise, revert to Stage 4.

In certain embodiments, the method described above can also include a combination of a signal zero-crossing rate analysis, a low frequency energy analysis, and a total energy analysis.

Signal Zero-Crossing rate is generally referred to as the number of times the sample signal fluctuates between being positive and being negative within a certain time period. Zero-crossing rate of a frame can be represented as $$ZCR = \sum_{i=0}^{n-2} \operatorname{sgn}(s(i+1) * s(i)),$$

where n is the number of the sample points of the current frame, and s(0)~s(n−1) are individual sample points of the current frame.

Low-frequency energy of a frame can be calculated as: $LFE=h(i) \otimes s(i)$, where h(i) is a low-pass filter of 10-order with the cut-off frequency of about 500 k, s(i) represents sample points of the current frame, and $\otimes$represents a convolution operation.

Total energy of the current frame can be calculated as:

$$TE = \sum_{i=0}^{n-1} S^2(i), s(i)$$

are sample points of the current frame.

In some embodiments, a decision stage can include comparing the calculated ZCR, LFE, and/or TE values with a threshold. If any parameter is larger than its corresponding threshold, a speech signal is indicated; otherwise, a noise signal is indicated. The thresholds of ZCR, LFE, and TE can be similarly set as that of the weighted linear prediction energy. For example, the thresholds of ZCR, LFE, and TE can be the averaged value of the first m frames.

Figure 5:
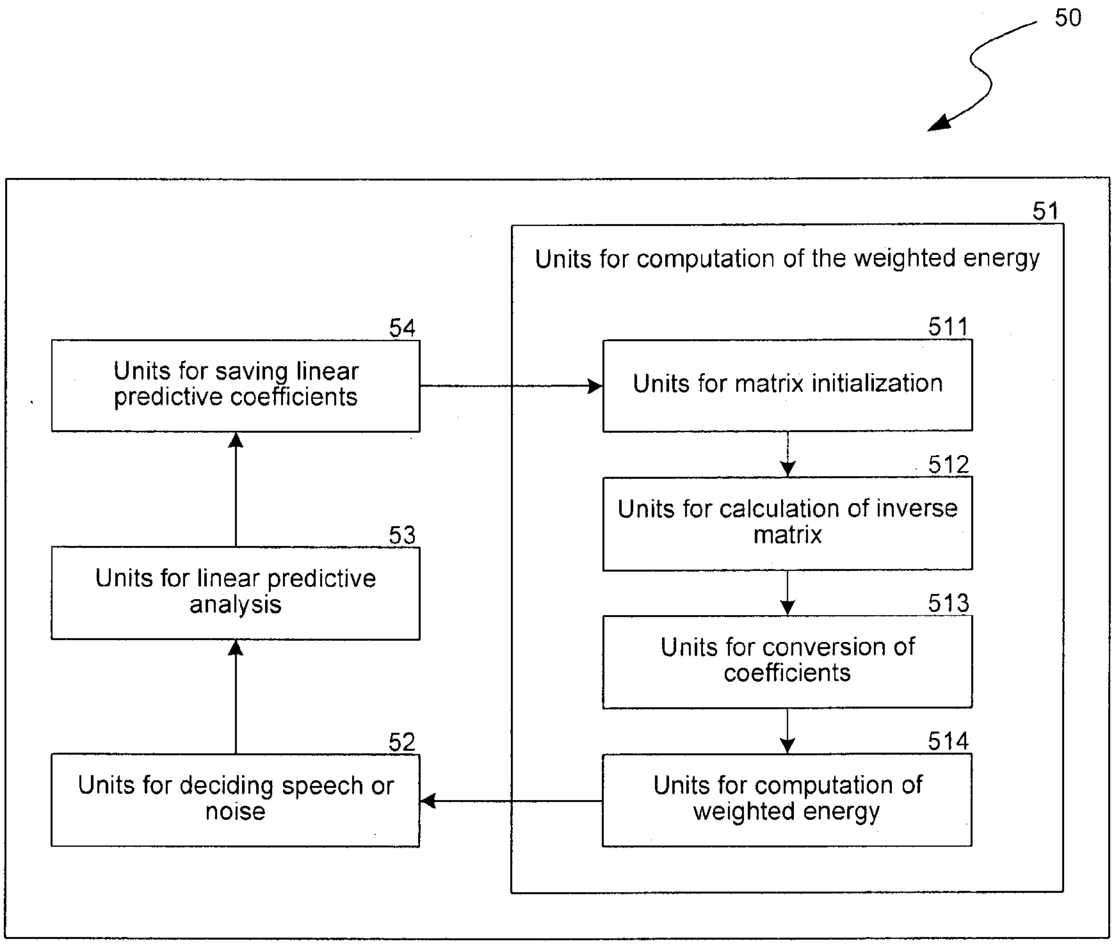
FIG. 5 is a block diagram illustrates an apparatus for voice activity detection in accordance with an embodiment of the present disclosure.

FIG. 5 is a block diagram illustrates an apparatus for voice activity detection in accordance with an embodiment of the present disclosure. Voice activity detection component 50 includes a weighted linear prediction energy computation component 51, a speech/noise decision component 52, a linear prediction analysis component 53 and a linear prediction coefficient storage component 52. Furthermore, linear prediction weighted energy computation component 51 includes a matrix set-up component 511, a matrix inverse component 512, a coefficient conversion component 513, and a linear prediction weighted energy solution component 514.

Linear prediction analysis component 53 first performs linear prediction analysis of the first frame, and obtains $N^{th}$-order linear prediction coefficients of the first frame. The $N^{th}$-order linear prediction coefficients of the first frame is stored into the linear prediction coefficient variety storage component 54 as the initial value of the N-order linear prediction coefficient variable. The matrix set-up component 511 sets up a n×n matrix A according to the N-order linear prediction coefficients $a_1$~$a_N$, where n is the number of sample points of the current frame. Matrix A could be represented as $A=[K_{ij}]$, in which $1 \leqq i, j \leqq n$, both i and j are natural numbers. Elements in matrix A is defined by: $K_{ij}=1$, when $i-j=0$, i and j are natural numbers; $K_{ij}=0$, when $i-j<0$ or $i-j>N$; $K_{ij}=a_{i-j}$, when $0<i-j \leqq N$. Inverse matrix of A is computed as $A^{-1}$, by which the weights $b_1$~$b_N$ are calculated using following equations: $b_i=K_{1,\,i+1}^{-1}$, $1 \leqq i \leqq N$, and N is an integral number, and i, j are natural numbers.

The coefficient conversion component 513 calculates intermediate coefficients $b_1$~$b_N$: $b_i=K_{1,\,i+1}^{-1}$, where i is a natural number from 1 to N. The linear prediction weighted energy solution component 514 first calculates the intermediate sequences z(i), where i is an integral number from 0 to N−1. When l=0, z(0)=s(0); when $1 \leqq i<n$, $$z(i) = \sum_{j=1}^{N} b_i * s(i-j) + s(i),$$

in which s(i) are samples of the current frame. Then based on the intermediate sequence z(0)–z(N−1), LPE is determined as $$LPE = \sum_{j=0}^{N-1} Z^2(j).$$

The above-mentioned LPE is transmitted to the speech/noise decision component 52 to determine whether a speech signal exists. A threshold can be set inside the speech/noise decision component 52. When the LPE is larger than the threshold, a speech signal exists in this frame. Otherwise, a noise signal exists. The threshold can be an averaged value of the LPE of the first several frames from the first frame, or it can be set based on the noise energy.

When the speech/noise decision component 52 decides that the frame contains a speech signal, component 52 sends this frame to linear prediction analysis component 53, which performs an linear prediction analysis on the frame. The resulted $N^{th}$-order linear prediction coefficients are saved into the $N^{th}$-order linear prediction coefficient variable. The procedure is performed in the speech coding process, which ensures that the saved value of the $N^{th}$-order linear prediction coefficient variable is the latest linear prediction coefficient of the speech signal.

Voice activity detection device 50 can also include a ZCR decision component (not shown), which calculates a ZCR value of the sample points in each speech frame as:

$$ZCR = \sum_{i=0}^{n-2} \mathrm{sgn}(s(i+1) * s(i)),$$

where n is the number of sample points in the current frame, s(0)~s(n−1) are the sample points of the frame, and determines whether the frame contains a speech signal based on the ZCR values of the sample points of the frame.

Voice activity detection device 50 can also include a LFE decision component (not shown), which calculates a LFE value of the sample points of each speech frame as: $LFE = h(i) \otimes s(i)$, in which h (i) is the low pass filter, s(i) is the sample point signal of the current frame. Then, according to the LFE of the sample points of each speech frame, the speech signal is decided.

Voice activity detection device 50 can also include a TE decision component (not shown), which calculates the total energy of the sample points of each speech frame as:

$$TE = \sum_{i=0}^{n-1} S^2(i),$$

where s(i) is the sample point signal of the current frame. Then according to TE of the sample point of each speech frame, the speech signal is decided.

Embodiments of the methods and devices described above can reduce the complexity of the voice detection process. For example, the ZCR procedure typically does not utilize multiplication, 10N Low frequency filter needs 10N multiplication, TE uses N multiplication, and LP coefficients need 4N multiplications. Therefore, 15N multiplications are used. According to conventional techniques, voice activity detection implements linear prediction analysis. The linear prediction analysis of any order at least involves $$\frac{N^2}{2}$$

multiplications. For a 256-point frame, suppose speech and noise's presence is half and half, the percentage of saved multiplications can be at least $$\frac{\frac{N^2}{2} \times 50\% - 15N}{\frac{N^2}{2} \times 50\%} = 76.56\%$$

Thus, the methods and devices disclosed in the application can reduce the complexity and the cost of calculation for voice activity detection.

From the foregoing, it will be appreciated that specific embodiments of the invention have been described herein for purposes of illustration, but that various modifications can be made without deviating from the inventions. Certain aspects of the invention described in the context of particular embodiments may be combined or eliminated in other embodiments. Additionally, where the context permits, singular or plural terms can also include plural or singular terms, respectively. Moreover, unless the word "or" is expressly limited to mean only a single item exclusive from the other items in reference to a list of two or more items, then the use of "or" in such a list means including (a) any single item in the list, (b) all of the items in the list, or (c) any combination of the items in the list. Additionally, the term "comprising" is used throughout the following disclosure to mean including at least the recited feature(s) such that any greater number of the same feature and/or additional types of features or components is not precluded. Accordingly, the invention is not limited, except as by the appended claims.

We claim:

1. A method for detecting voice activity, comprising:

pre-processing a first frame in an audio frame sequence through a linear prediction analysis component of a voice activity detection device;

receiving a subsequent frame as a current frame to process;

calculating weighted linear prediction energy of the current frame through a linear prediction weighted energy computation component of the voice activity detection device based on $N^{th}$-order linear prediction coefficients stored in a linear prediction coefficient storage component of the voice activity detection device, where N is a natural number;

determining whether the current frame contains a noise signal or a speech signal through a speech/noise decision component of the voice activity detection device based on the calculated weighted linear prediction energy;

if a speech signal is indicated, performing linear prediction analysis on the current frame to derive $N^{th}$-order linear prediction coefficients for the current frame and storing in the linear prediction coefficient storage component, and updating the $N^{th}$-order linear prediction coefficients with the derived $N^{th}$-order linear prediction coefficients for the current frame; and if a noise signal is indicated, determining whether the current frame is the last frame in the audio frame sequence;

if no, repeating the calculating and determining processes.

2. The method of claim 1, wherein pre-processing a first frame further includes:

Performing a linear prediction analysis on the current frame and calculating $N^{th}$-order linear prediction coefficients;

Calculating weighted linear prediction energy with the $N^{th}$-order linear prediction coefficients; and Determining whether the current frame contains a speech signal or a noise signal based on the weighted linear prediction energy.

3. The method of claim 1 wherein calculating weighted linear prediction energy further includes:

establishing an n×n matrix A based on the $N^{th}$-order linear prediction coefficients $a_1$~$a_N$; n is the number of sample points in the current frame; matrix A can be represented as $A=[K_{ij}]$, in which $1 \leqq i, j \leqq n$, and both i and j are natural numbers; $K_{ij}=1$ when $i-j=0$; $K_{ij}=0$ when $i-j<0$ or $i-j>N$; and $K_{ij}=a_{a-j}$ when $0<i-j\leqq N$;

calculating the inverse matrix of A as $A^{-1}=[K_{ij}]^{-1}$, in which $1\leqq l, j\leqq n$, and both i and j are natural numbers;

calculating intermediate parameters $b_1$~$b_N$ as $b_i=K_{1,i+1}^{-1}$, $1\leqq i\leqq N$, where N is an integer;

calculating an intermediate parameter sequence z(i), where i is an integer between 0 and N−1, as follows:

$z(0)=s(0)$ when i=0;

$$z(i) = \sum_{j=1}^{N} b_i * s(i-j) + s(i)$$

when $1\leqq i<N$, where s(i) are sample points of the current frame; and calculating the weighted linear prediction energy (LPE) as follows:

$$LPE = \sum_{j=0}^{N-1} z^2(j).$$

4. The method of claim 1 wherein determining whether the current frame contains a noise signal or a speech signal includes setting a threshold, and wherein if the derived weighted linear prediction energy is larger than the threshold, the frame is indicated as a speech frame; otherwise, the frame is indicated as a noise frame.

5. The method of claim 4, wherein threshold is set as an average weighted energy of multiple previous frames, or according to a noise energy.

6. The method of claim 1 wherein performing linear prediction analysis on the current frame includes performing linear prediction analysis on the current frame in during speech encoding.

7. The method of claim 1, further comprising calculating a zero-crossing rate (ZCR) of sample points in the current frame as:

$$ZCR = \sum_{i=0}^{n-2} \operatorname{sgn}(s(i+1) * s(i))$$

S(0)~S(n−1) are sample points of a frame and n is the number of sample points.

8. The method of claim 1, further comprising calculating a low-frequency energy (LFE) of the current frame as:

$LFE=h(i)\otimes(i)$,

Where h(i) is a low-pass filter, s(i) is samples of the current frame, and $\otimes$represents a convolution operation.

9. The method of claim 1 further comprising calculating a total energy (TE) of the current frame as:

$$TE = \sum_{i=0}^{n-1} s^2(i)$$

s(i) are samples of the current frame.

10. A device for voice activity detection, comprising:

a component for storing $N^{th}$-order linear prediction coefficients;

a component for performing linear prediction analysis; this component performs linear prediction analysis on the first audio frame to acquire the $N^{th}$-order linear prediction coefficients to be used as the initial value of the $N^{th}$-order linear prediction coefficient variable; this component also performs linear prediction analysis on successive audio frames and updates the Nth-order linear prediction coefficient variable with the derived linear prediction coefficients of successive frames;

a component for computing a weighted linear prediction energy for calculating the weighted linear prediction energy of each audio frame; this component further includes:

a component for establishing an n×n matrix A based on the $N^{th}$-order linear prediction coefficients $a_1 \sim a_N$; in is the number of sample points in the current frame; matrix A can be represented as $A=[K_{ij}]$, in which $1 \leqq i, j \leqq n$, and both i and j are natural numbers; $K_{ij}=1$ when $i-j=0$; $K_{ij}=0$ when $i-j<0$ or $i-j>N$; and $K_{ij}=a_{a-j}$ when $0<i-j \leqq N$;

a component for calculating an inverse matrix of matrix A as $A^{-1}=[K_{ij}]^{-1}$, wherein $1 \leqq l, j \leqq n$ and i and j are natural numbers;

a coefficient conversion component for calculating intermediate parameters $b_1 \sim b_N$, and $b_i=K_{1,\, i+1}{}^{-1}$;

a component for calculating a weighted linear prediction energy; this component first calculates an intermediate parameter sequence z(i) where i is an integer between 0 and N−1, as follows:

$$z(0)=s(0) \text{ when } i=0;$$

$$z(i) = \sum_{j=1}^{N} b_i * s(i-j) + s(i)$$

when $1 \leqq i < N$, where s(i) are sample points of the current frame and calculates the weighted linear prediction energy (LPE) as $$LPE = \sum_{j=0}^{N-1} z^2(j); \text{ and}$$

a component for determining whether the current frame contains speech or noise based on the calculated weighted linear prediction energy; if the audio frame is determined to contain speech, the component transmits the current frame to the component for performing linear prediction analysis.

* * * * *